(12) United States Patent
Lincke

(10) Patent No.: US 6,640,744 B2
(45) Date of Patent: Nov. 4, 2003

(54) TEAT RUBBER

(76) Inventor: Kathrin Lincke, Fruehlingstrasse 10, 86842, Tuerkheim (DE)

(*) Notice: Subject to any disclaimer, the term of this patent is extended or adjusted under 35 U.S.C. 154(b) by 0 days.

(21) Appl. No.: 10/257,813

(22) PCT Filed: Apr. 17, 2001

(86) PCT No.: PCT/EP01/04350
§ 371 (c)(1),
(2), (4) Date: Oct. 15, 2002

(87) PCT Pub. No.: WO01/78500
PCT Pub. Date: Oct. 25, 2001

(65) Prior Publication Data
US 2003/0136344 A1 Jul. 24, 2003

(30) Foreign Application Priority Data
Apr. 14, 2000 (DE) .......................... 100 18 870

(51) Int. Cl.⁷ .............................. A01J 5/04; A01J 5/08
(52) U.S. Cl. .................. 119/14.47; 119/14.49
(58) Field of Search ............. 119/14.47, 14.48, 119/14.49

(56) References Cited

U.S. PATENT DOCUMENTS

| | | | |
|---|---|---|---|
| 2,334,481 A | | 11/1943 | Silveira |
| 2,531,266 A | | 11/1950 | Gierl |
| 4,249,481 A | | 2/1981 | Adams |
| 5,007,378 A | * | 4/1991 | Larson ............ 119/14.47 |
| 5,161,482 A | * | 11/1992 | Griffin ............ 119/14.02 |
| 5,857,424 A | * | 1/1999 | Johnston ........... 119/14.47 |
| 6,546,893 B1 | * | 4/2003 | Happel et al. ...... 119/14.47 |

FOREIGN PATENT DOCUMENTS

| | | |
|---|---|---|
| DE | 29 41 150 | 7/1972 |
| DE | 38 10 160 | 10/1989 |
| DE | 196 23 386 | 12/1997 |
| DE | 196 35 719 | 3/1998 |
| DE | 198 12 573 | 9/1999 |
| EP | 0266809 | 9/1987 |
| WO | WO 01/78500 | 10/2001 |

* cited by examiner

*Primary Examiner*—Yvonne Abbott
(74) *Attorney, Agent, or Firm*—Howard M. Cohn (57) ABSTRACT

According to the invention, a liner is provided for use with a substantially undeformable teatcup shell (40), for forming a two-chambered teatcup, by means of which milk is extracted from a teat (Z) in a suction milking process through a milking vacuum provided during a milking phase, and the teat is massaged during a rest phase, wherein the liner comprises a head part (12) that is substantially rotationally symmetrical relative to its longitudinal axis and a barrel part (14) that is connected to the head part (12) by means of a transitional part (22), the barrel part (14) is flexible, surrounds the teat and reacts to alternating changes in pressure during the milking and rest phases by changing its form, the head part (12) is formed as an annular tube (16), which forms an insertion opening (18) for the teat (Z), and which ensures sealing relative to the milking vacuum and the best possible grip of the liner to the teat without excessively constricting the teat during both the milking and the rest phases, the annular tube (16) is configured in such a way that an annular hollow space (30) is defined by the teat, the transitional part (22) and the annular tube (16) once the teat is introduced into the barrel part (14), the inner width of the annular tube (16) is smaller during the milking phase than the inner width of the area of the barrel part (14) provided for the teat (Z), and the annular tube (16) is sufficiently flexible that its inner width is enlargeable radially outward and its axial length is changeable during introduction of the teat.

10 Claims, 5 Drawing Sheets

TEAT RUBBER

TECHNICAL FIELD

The present invention relates to a liner for a substantially undeformable teatcup shell for forming a two-chambered teatcup, by means of which milk is extracted from a teat in a suction milking process through a milking vacuum during a milking phase and the teat is massaged during a rest phase.

RELATED ART

In a milking machine the liner (or teatcup liner or teat rubber) forms the contact zone between the milking machine and the animal to be milked and, therefore, constitutes a part of the milking machine which is essential, but not easy to design. It is particularly difficult to design the head part together with the head hole opening of the liner (teat liner) which have to achieve several functions: the head hole opening or, in other words, the insertion opening for the teat has to adapt itself well to the different teat shapes and sizes as well as teat positions and conditions in order to seal the milking vacuum being present under the teats against environment pressure. Hereby, however, the teats must not be constricted since pains and swellings occurr in the teat skin in case of restriction of the blood circulation. If these occur, due to tenseness of the udder musculature the degree of emptying the udder decreases, the milking time increases and the strippings (milk which has to be milked from the udder by particular milking labor after "normal milking") increases.

In the region of the Fuerstenberg Vein Ring at the transition region from the teats to the udder bottom there are particularly many blood and lymph vessels. Since this region, being an infection barrier, already in the natural state constitutes a bottleneck, there is a danger of obstruction of the milk discharge in case of constrictions of the blood and lymph vessels due to hard liners having narrow insertion openings, which results in closing of the bottleneck by swelling. In order to pass this swollen bottleneck and to obtain the remaining milk, the teatcup cluster or the single teatcups have to be drawn downwards away from the udder. This operation, called "stripping", requires additional man power or sophisticated apparatuses and prolongs the milking operation considerably. The stress on the teat tissue during this time period is particularly high because only little milk flows and accordingly the highest milking vacuum acts on the teats. Teat damages with subsequent problems of udder health may result from this.

Furthermore, an essential quality criterion for liners consists in how well the liners hold the teatcups in an optimum milking position still below the Fuerstenberg Vein Ring although a continued suction acts on the teats by means of the applied milking vacuum.

In known liners for two-chambered teatcup assemblies for a suction milking process, a head part is contiguous to the end of the tube part facing the udder because of the following reason. The tube part, called "shaft part" or "barrel part" (hereinafter "barrel part"), is inserted in a rigid or undeformable teatcup (milking cup) coaxially to the latter such that between the barrel and the teatcup a closed annular space is formed which is in communication with a pulsator. Depending on the milking principle used, by means of the pulsator, this space is alternatingly supplied with vacuum in the milking (or suction or suctioning) phase (hereinafter "milking phase") and is supplied with air under atmospheric pressure or overpressure in the relief or rest phase (hereinafter "rest phase"). In any case between the inner part of the barrel, in which during milking the teat is disposed, and the annular space there is a pressure difference by means of which the tube part is folded. The pressure on the teat resulting therefrom massages back from the teat tip the blood and the tissue liquid suctioned by the milking vacuum together with the milk. In order to stretch the closing muscle of the teats in the milking phase the space under vacuum must have a cross section which ist slightly larger than the teat. Therefore, the tube part, which is continuously folding and partly also over-stretched by the higher vacuum in the annular space, rests only insufficiently tightly on the teat and allows only a very poor adhesion on the teat. This is the reason why, at the side of the liner shaft facing the udder, an additional sealing element, which is typically referred to as "liner head", is required.

Examples of liner heads are known wherein the insertion openings for the teats are shaped as annular lips. In DE 196 23 386 A1 an example is described wherein the annular lip is provided with an additional tube part in order to increase the bearing area on the teats and, hence, to reduce the bearing pressure. This tube part, however, is variable only to a small degree in its diameter.

Other examples are described inter alia in DE 29 41 150 C2 and DE 196 35 719 A1. In cases where these liners with the relatively small sealing lip are produced of hard material, they seal well, but they press in a deforming manner in particular into thick teats, thereby constricting them and restricting the area of the Fuerstenberg Vein Ring at the transition from the teat to the udder bottom. In many cases they are not satisfactory with respect to their physiological properties, and have only limited adaptability to different teat sizes. In cases where these liners have soft and flexible annular lips, they can adapt well to the teats, but there is a tendency for air intrusions to occur. Therefore, they adhere worse and soon start to climb up or to slip down the teat. Furthermore, particularly, soft liner heads having thin walls are subject to high wear.

The drawings of DE 38 10 160 A1 and of DE 198 12 573 A1 show liners, the head part of which is each shaped as a continuation of the tube part without transition. In both examples there is no sealing annular lip, but no closed annular space independent from the pulse space is described which would be able to adapt itself to different and, in particular, to small teat sizes.

Namely, nothing can be learned from any of the previously mentioned documents about the design of the shown head part, least of all with respect to the functioning thereof or the importance for the tightness of the teat rubber: DE 38 10 160 A1 is directed to compensate for cyclic fluctuations of the negative pressure in the teatcup cluster by means of a control valve operated in a particular manner. The illustration of the head part is such that the upper end of the barrel part is turned up toward the outside and is attached to the outside of the barrel part below or is only resting closely on it. The turned-up part rests at the transition area from the teat to the udder and is located further radially outside with respect to the barrel part. On the other hand, DE 198 12 573 A1 seeks to provide a teatcup cluster which functions without a pulsator. This is achieved by providing a direct connection pipe between one of the pulse spaces of the teatcup cluster and a negative-pressure area of the teatcup cluster, as well as a switching valve positioned in the connection pipe, the switching valve in its suction position unblocking the connection pipe and in its relief or rest position throttling the connection pipe, wherein in the rest position the pulse space is connected with a pressure gas source. The head part is also illustrated as being a turn-up of the upper end of the barrel part toward the outside attached below at the outside of the barrel part. The inner width thereof is larger than the largest inner width of the barrel part.

In the document U.S. Pat. No. 4,249,481 a liner having an upper end shaped as an annular tube is described. The teat-surrounding tube part of the described liner has a double wall, the thus formed annular chamber, at the udder-side end, ending in an annular space, which is somewhat enlarged radially toward the outside, and which is provided with a connection part for being alternatingly supplied with pressure and vacuum. This liner is provided for pressing out the milk from the teat. Since, according to the description, the annular space has to be vacuum-resistant, it cannot be manufactured in a very large and soft shape, which adversely affects a good adaptability to the teat.

EP 266 809 B1 discloses a liner used in a pressure milking process in which the milking with hands serves as a model. The sealing lip here has a prolongation which is turned up toward the inside and toward the bottom. The lower end of the prolongation is pressed at the upper end of a tube part by means of a rigid ring in order to form a tight connection with this tube part, which from the hygienic point of view may be problematic. Thereby an annular space surrounding the teat is formed which is in connection with the space between teatcup shell (teatcup sleeve or simply shell) and tube part. In different milking phases these spaces are alternatingly supplied with pressured air and vacuum. Thereby the prolongation in one phase presses onto the teat and thus squeezes the milk out of the teat, and in the other phase stretches the teat for allowing milk to flow again into the teat. Hence, this annular space—facing the udder—has a milking function. The function of sealing towards the teat, therefore, is taken over by that upper part of the annular space which is formed in a stronger way and is resting on the teat, i.e. the sealing lip. With such a pressure milking process a sufficient milking speed cannot be achieved. Furthermore, on a long-term the teats are damaged.

The object of the present invention is to provide a long wearing liner for a two-chambered teatcup for a suction milking process which adheres very well even with strongly different teat sizes and with low milking vacuum, which does not cause air intrusions and does not climb up even with low weight of the teatcup cluster, but which does not constrict the teats, and thus allows the milking of nearly the entire milk which is available, without additional stripping labor being required.

This object is achieved with a liner according to claim 1. Advantageous embodiments of the invention are the subject-matter of the subclaims.

When the inventive liner is pushed onto a teat which is much thicker than the inner width of the annular tube, the elastic annular tube is widened by the teat and is lengthened in the axial direction thereof. Due to such widening and axial lengthening, the surface area of the annular tube bearing on the teat is increased, which on the one hand increases the sealing effect and on the other hand keeps the pressure on the teat small. In a case where the inventive liner is pushed onto a teat which is only slightly thicker than the inner width of the annular tube, the milking vacuum which is supplied permanently in the barrel part results in the annular tube being drawn radially toward the inside and toward the bottom and the annular tube resting in a sealing manner on the teat. In this case, too, a large and thus gentle bearing surface of the liner on the teat is achieved. The effect of the milking vacuum of course also occurs with thick teats. With teats oriented in an oblique manner or being irregularly shaped, the annular tube may deform also in a non-rotationally-symmetric manner, and thus may softly and sealingly adapt to the given physiological geometry. Therefore, the inventive liner adapts to the different teat shapes without any problem. Furthermore, by automatic reduction of the inner width of the teat rubber, it compensates for the teat becoming flabbier and flabbier in the course of the milking, and thus avoids air intrusions. In other words, the annular tube always serves for sealing and never for milking as such. Additionally, by designing the sealing part of the inventive liner as an annular tube, a frequent widening and over-stretching and resulting permanent deformation of the head part—as is the case with a sealing lip—is avoided, which results in longer running times, and thus improved economic efficiency.

SHORT DESCRIPTION OF THE DRAWINGS

Further advantages, features and particularities of the invention are evident from the following description of preferred, but not limiting embodiments of the invention in connection with the schematic drawings which are not to scale.

DETAILED DESCRIPTION OF THE PREFERRED EMBODIMENTS

For the purpose of ease of the further explanation, the direction and orientation indications of the liners illustrated herein refer to the position of the liner when it has been pushed onto the teat. The part illustrated in the figures on the top is the part facing the udder bottom, accordingly that part of the milking apparatus which leads to the milk collecting container adjoins at the part illustrated at the bottom.

Figure 1:
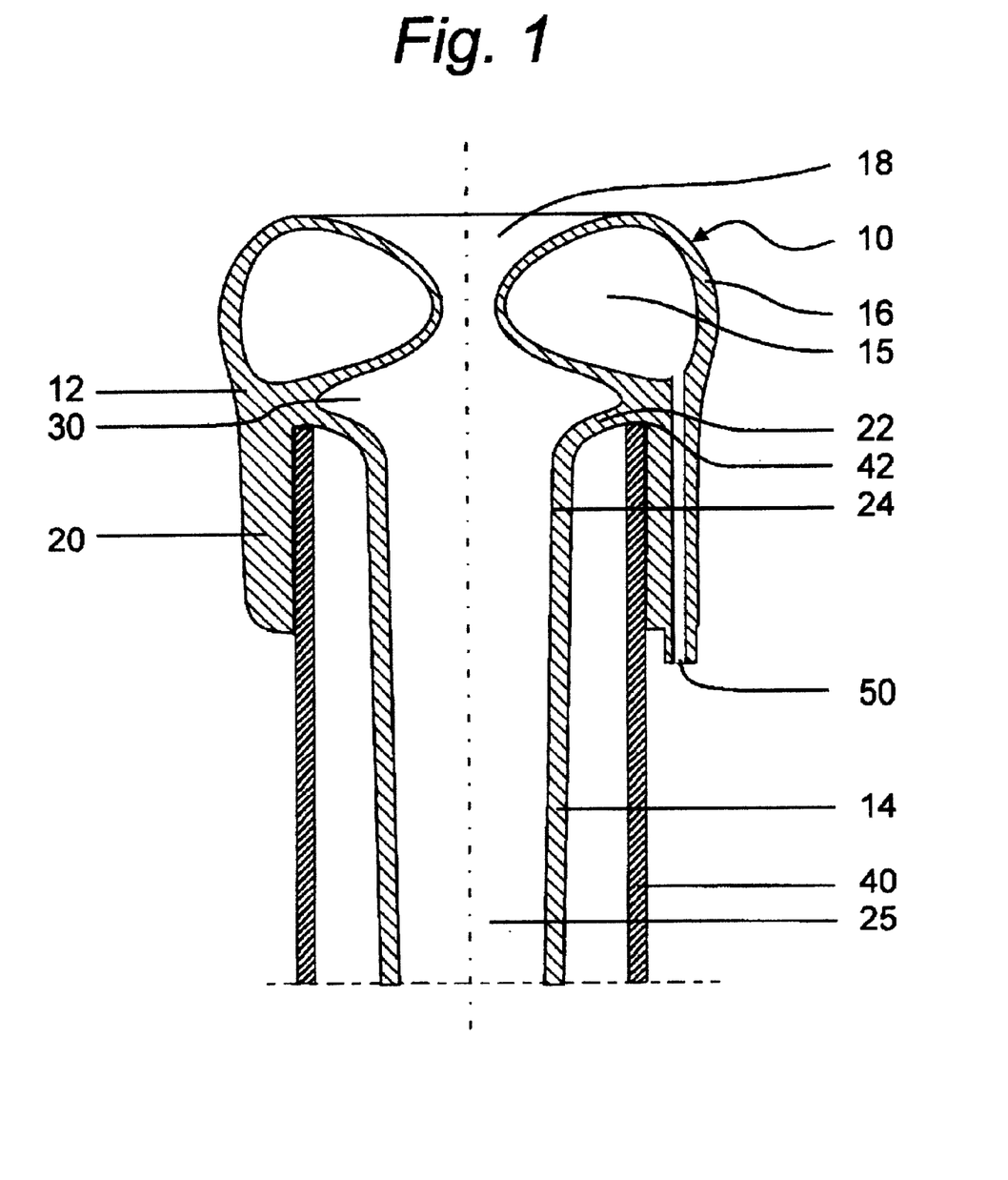
FIG. 1 is a sectional view of a first embodiment of the inventive liner having a connection channel to the annular tube.

Referring initially to FIG. 1, a first advantageous embodiment of the invention is described. In the illustrated example, a liner 10 comprises a barrel part 14, a holding edge 20 for pushing onto a shell 40, a transitional part 22 connecting the upper edge 24 of the shaft or barrel part 14 in the region of the upper edge 42 of the shell 40 with the holding edge 20, and a head part 12 which is also connected in the region of the upper edge 42 of the shell 40 both with the transitional part 22 and the holding edge 20. These elements, which are part of the teatcup interior, are tightly connected with each other, which is imperative in the least because of hygienical reasons. The milking vacuum is provided in the interior 25 of the barrel part 14. The liner is—except for details to be described later on—rotationally symmetric relative to its longitudinal axis and is inserted into the top of the shell 40, the holding edge having been pushed onto the upper edge 42 thereof. It is also possible to manufacture the liner without the holding edge 20, in this case another way of attachment at the shell would be used, e.g. with inserting by press fitting.

The head part 12 is formed as an annular tube 16 coaxial with the barrel part 14 and defining an insertion opening 18 for a teat Z, and having different shapes depending on the application purpose or desired adaptation. The inner width of the annular tube 16 shown in FIG. 1 is much smaller than the maximum inner width of the barrel part 14, but it may also be nearly as large as the latter. In a case where the inner width of the annular tube in the undeformed state is larger than the maximum inner width of the barrel part, the annular tube has to be shaped such that its inner width—at least in the milking phase—is smaller than the maximum inner width of the barrel part, which is then widened. The annular tube 16 is closed so that the volume of the interior 15 enclosed by the annular tube—apart from compression due to change of shape—remains substantially constant. In this embodiment, the annular tube is filled with air under a predetermined pressure.

It is advantageous if the annular tube 16 comprises an opening 50 which, in this example, also penetrates the holding edge 20 (here illustrated on the right side). Such an opening 50 may, as an alternative, also be designed such that it penetrates the annular tube 16, e.g., in a radial direction. Through this opening 50, the interior 15 may be supplied with pressure or may be filled with an appropriate material. In this manner, the stiffness or the resilience, thus the adaptability, as well as, given the according shaping of the annular tube 16, the shape thereof, in particular the inner width thereof, may be varied. Hence, during the course of the milking operation, when the teat begins to become flabbier, e.g., by increasing the pressure in the interior 15 the inner width of the annular tube 16 and, if necessary, the bearing pressure of the annular tube 16 onto the teat may be increased and thus the danger of air intrusions may be avoided. A further advantage of such a combination consists in that vibrations can be generated by pressure changes in the interior 15 which exert a stimulation effect on the teat and the udder. Such pressure changes are usually generated by a control device called a "pulsator".

Instead of air, the interior 15 may be filled with another gas, a liquid (of course, possibly also water) as well as with a material forming a gel or a foam. In case no opening 50 is provided, upon manufacturing, the inner pressure of the filling material may be chosen such that the annular tube assumes a certain shape. This is particularly advantageous in a case where the walls of the annular tube are relatively thin and the interior 15 is filled with a gel.

However, the annular tube 16 does not need to be closed, i.e. the opening 50 may remain non-closed. In this case, for manufacturing of the annular tube, a material having the appropriate wall thicknesses has to be used such that the annular tube 16 maintains its shape by itself without the help of an inner pressure.

The lower part of the annular tube 16 and the transitional part 22 define between them a hollow space 30, the function of which is described hereinbelow.

FIGS. 2 to 8 illustrate further embodiments of the invention. Parts already illustrated and described in connection with FIG. 1 bear the same reference signs, and are not further described. Also, the other statements made in connection with the first embodiment with respect to shape and function apply—unless otherwise stated—for all of the other embodiments.

Figures 2, 3:
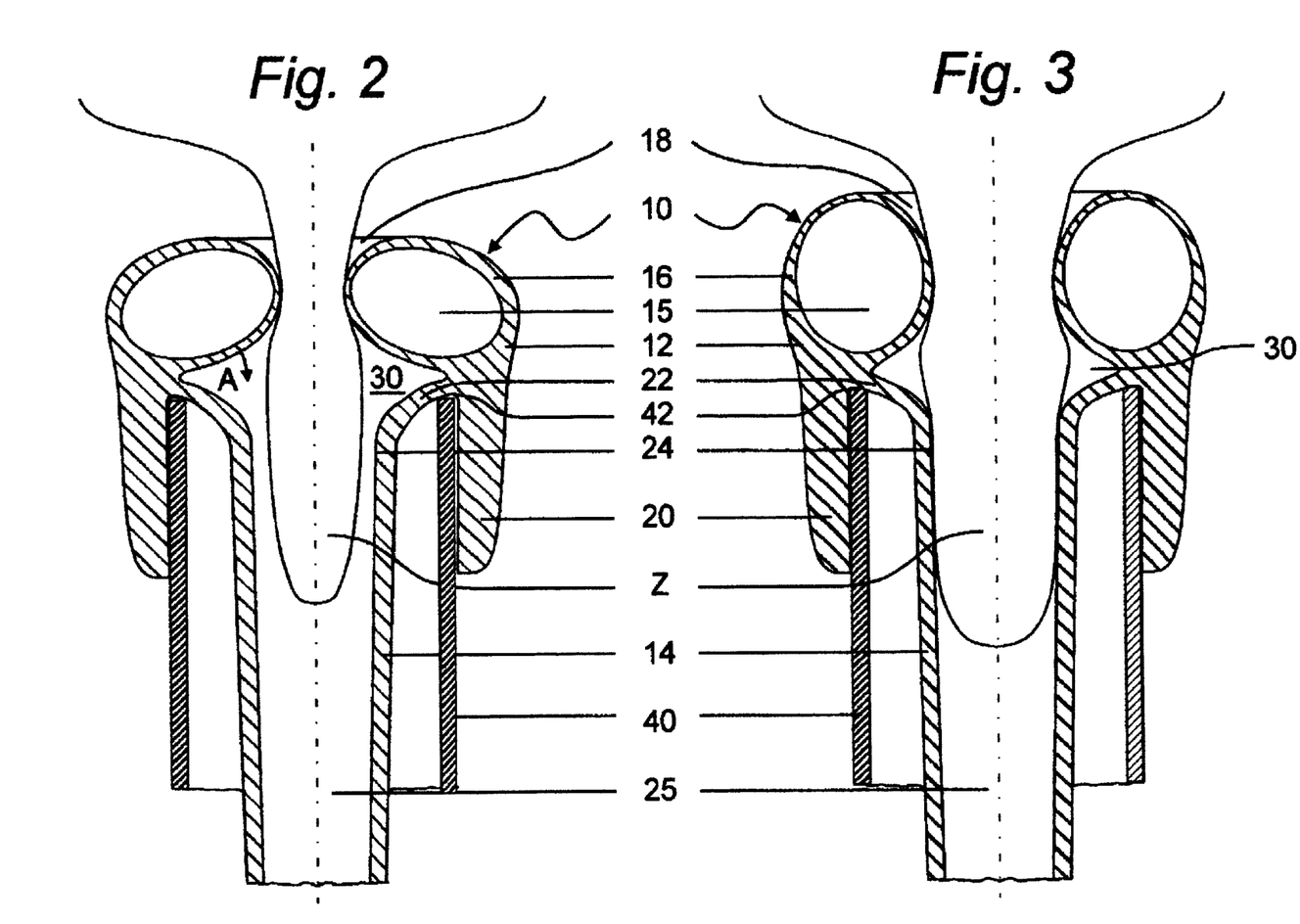
FIG. 2 is a sectional view of a second embodiment of the inventive liner with a thin teat inserted therein, in the milking phase.
FIG. 3 is a sectional view of a second embodiment of the inventive liner with a thick teat inserted therein, in the milking phase.

FIGS. 2 and 3 illustrate, side-by-side, how, according to a second embodiment, the annular tube 16 of the liner deforms by inserting a thin and a thick teat Z, respectively, and adapts thereto. Immediately after insertion of a thin teat Z into a head part 12 having only a slightly narrower annular tube 16, the annular tube 16 rests with only little pressure on the teat Z. The annular tube 16 is hereby pushed somewhat in the radially outside direction and changed in its axial direction. Hereby the bearing surface thereof on the teat Z is increased and thus also the sealing behavior thereof. In an embodiment where no opening is provided in the annular tube 16, this increase of the bearing surface can be controlled by an appropriate choice of the inner pressure generated in the interior 15 of the annular tube 16 upon manufacturing thereof. In the whole hollow space 30, due to ambient pressure, the milking vacuum in the barrel part 14 applies a force (indicated by the arrow A), which is directed toward the bottom, onto the annular tube 16 and thus pulls the annular tube 16 toward the bottom. Also, by this, the bearing pressure of the annular tube 16 is increased and the bearing surface is increased. This situation is illustrated in FIG. 2.

From FIG. 3 it is evident that, upon insertion of a thicker teat, the annular tube 16 is deformed more into the radially outside direction and in the axial direction. Of course, in this case, there is a higher bearing force than upon inserting a thinner teat, which, however, does not result in the teat being constricted as is the case with conventional liners, but rather the bearing force is applied to a larger surface area—thereby, the bearing pressure is reduced. From the consideration of both FIGS. 2 and 3 it is evident that the liner according to the invention is useful for a very large range of teat sizes. According to the illustration in FIG. 3 showing the suction condition, the thick teat rests very closely at the barrel part 14 and thus seems to seal the hollow space 30 against the milking vacuum applied below the teat. On the one hand, however, it is not the case that in the milking phase the barrel part 14 with its whole circumference rests closely and sealing at the teat, but here wrinkles may well be formed, by means of which a communication with the hollow space 30 is established. On the other hand such wrinkles are usually formed upon transition into the rest phase so that the force directed toward the bottom and described in connection with FIG. 2 acts onto the annular tube 16 also in case of thick teats.

Figure 4:
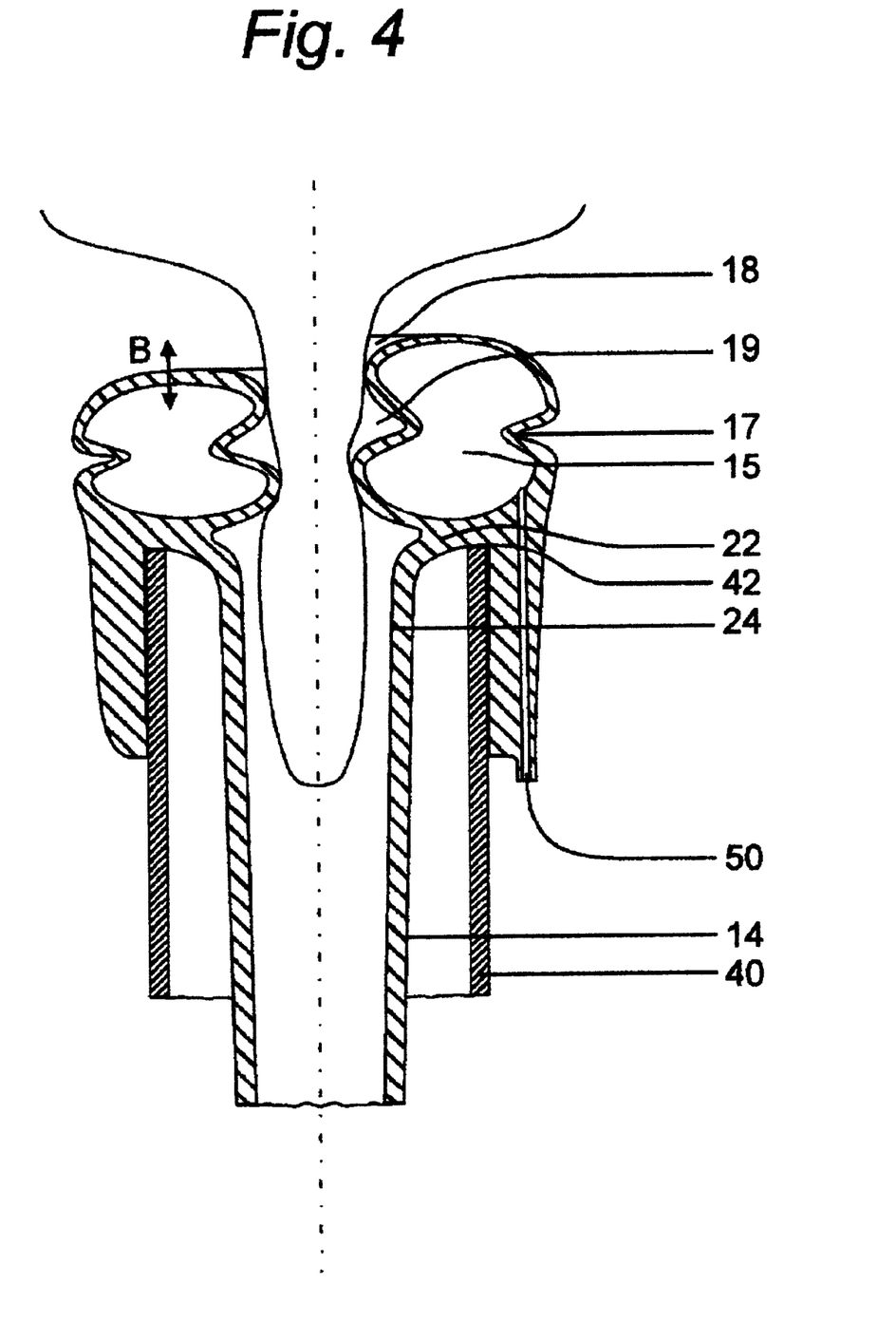
FIG. 4 is a sectional view of a third embodiment of the inventive liner having an annular tube shaped as a double bulb.

FIG. 4 shows a third embodiment wherein the annular tube 16 is formed as a double-bulb by providing a radially outwardly arranged constriction 17 and a radially inwardly arranged constriction 19. The constrictions 17, 19 form spring joints by means of which the axial length of the annular tube 16 may be changed, as is indicated by the double-arrow B in the left half of the drawing showing a state in which it compressed with respect to the right half of the drawing. At the spring joints, the annular tube 16 can also be pivoted with respect to the axis. Such pivotability is particularly advantageous in cases where the liner is pushed onto a teat projecting from the udder not vertically toward the bottom, but rather obliquely. The pivoting prevents the insertion opening 18 coming to rest on the teat in such an oblique manner that air intrusions result due to the oblique position. It is clear that also several of such constrictions may be provided which do not necessarily have to be disposed all in pairs as in the above example. Additionally, the spring joint(s) may be designed such that due to applying pressure changes, stronger vertical movements of the whole teatcup can be caused which give rise to an additional stimulation and tonus relaxation of the musculature. A similar double-sided spring joint is known from the document DE 196 35 719 A1 mentioned hereinabove. However, in that document the spring joint delimits a prolongation of the space between barrel part and rigid shell, the prolongation thus unavoidably being dependent upon the pressure changes controlled by the pulsator which define the suction and the rest phases. The spring joint described in that document does not delimit any annular tube resting as a sealing means on the teat and determining the teatcup position at the teat, but it moves substantially in the same direction as the tube part.

Figures 5, 6:
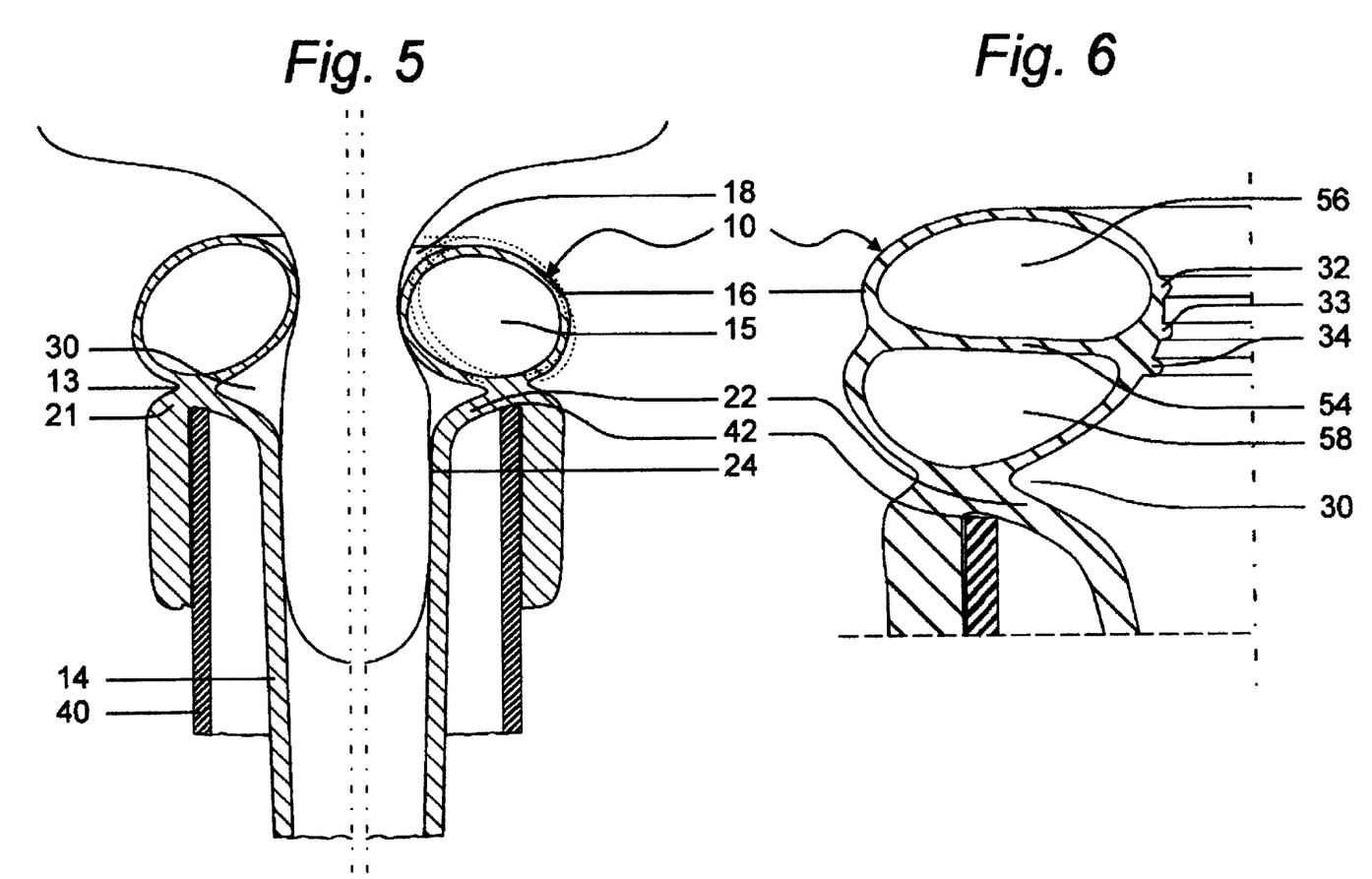
FIG. 5 is a sectional view of a fourth embodiment of the inventive liner having a joint in the region of the holding edge.
FIG. 6 is a sectional view of a fifth embodiment of the inventive liner having additional holding ribs.

According to the illustration in FIG. 5 the head part 12, at its radially outward side in the region of the upper end 42 of the shell 40 or in the region of the upper end 21 of the holding edge 20, respectively, has a recess 13 which is similar to the constriction 17 and is arranged in a plane substantially orthogonal to the longitudinal axis of the liner 10 in the circumferential direction of the annular tube 16, and the annular tube 16 can be moved or tilted more easily either radially outwardly or inwardly. A spring joint for elastically pivoting the annular tube 16 is formed by this recess 13 together with the recess defined by the facing hollow space 30, too. In particular, a tilting toward the inside is highly desirable in the case that thin teats are being milked or the teat becomes flabbier during the milking operation and the head part 12 rests with a higher pressure on the teat. The dashed line on the right side of FIG. 5 indicates the position of the annular tube 16 before the radially inward tilting thereof.

FIG. 6 shows a further embodiment. The annular tube 16 comprises three annular lips 32, 33, 34 projecting on its radially inner side and being disposed in a plane substantially orthogonal to the longitudinal axis of the liner 10 in the circumferential direction thereof. These annular lips, of which there may be provided more or less than the three which are illustrated, improve the adhesion of the liners at the teat and prevent the sliding up or climbing of the liner toward the udder bottom.

In case the annular tube is subdivided by two or more transversal walls (not illustrated in the figure)—disposed e.g. in a plane containing the longitudinal axis—into corresponding annular segments, each of which via one corresponding opening 50 may be separately supplied with pressure or pressure changes while maintaining the minimum pressure required for the sealing, by means of a supply with alternating pressure changes, a swinging movement of the teatcups can be caused and thus a further way of massaging and stimulation of the teat can be performed. According to the illustration in FIG. 6 there is also the possibility to provide a partition wall 54 disposed in a plane substantially orthogonal to the longitudinal axis of the liner 10 and separating the annular tube into an upper tube portion 56 and a lower tube portion 58. In this case, by means of appropriate phase changing of the pressure in the tube portions, one tube portion may always be used for sealing and the respective other one for massaging the teat. Of course it is also possible to provide several such partition walls.

Figures 7, 8:
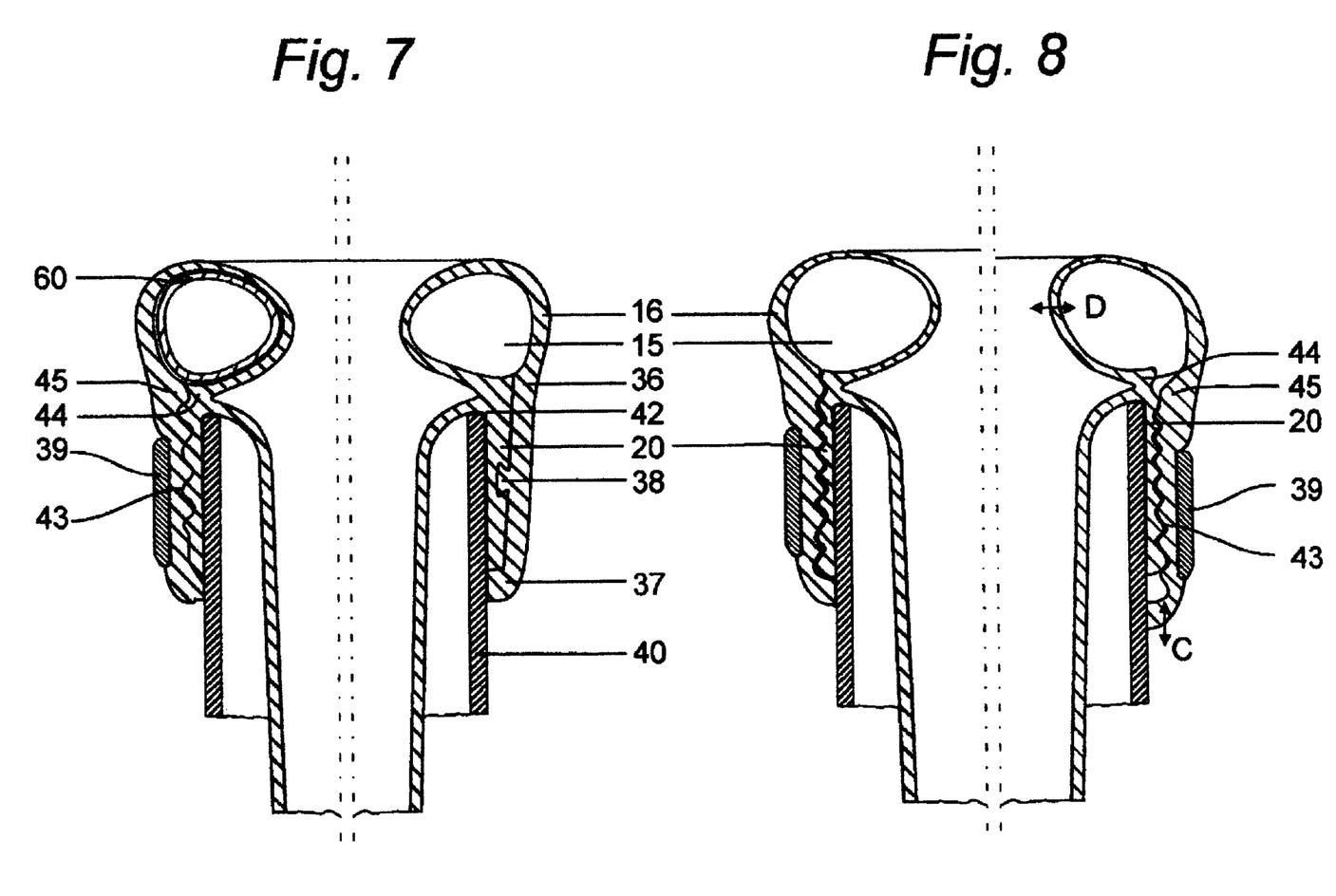
FIG. 7 is a sectional view of a sixth embodiment of the inventive liner having an annular tube which can be opened by unfolding.
FIG. 8 is a sectional view of a seventh embodiment of the inventive liner having an annular tube which can be opened by unfolding and can be adjusted in the axial direction.

FIG. 7 shows an annular tube 16 according to a further embodiment, which comprises, at the radially outer side, a tube-shaped protrusion 36 extending from the region of the upper end 42 of the shell 40 or from the upper end 21 of the holding edge 20 to the bottom and enclosing sealingly the holding edge 20 of the shell 40 at least over a part of the axial length thereof. Therein, the wall of the annular tube 16 is discontinuous over the whole circumference thereof symmetrically relative to the longitudinal axis thereof. A radially inner end 44 and a radially outer end 45 of the wall lie close to each other and seal the interior 15 of the annular tube 16. The protrusion 36 is connected with the radially outer end 45 of the discontinuous wall, and the holding edge 20 as well as the annular tube 16 are connected with the radially inner end 44 of the wall. Thereby, upon pulling up the protrusion 36 the annular tube 16 may be opened or unfolded, respectively, thereby providing access to the interior 15, which may also be of particular importance with respect to a simplified manufacturing.

Furthermore, the possibility of opening the annular tube 16 described above facilitates the insertion of an additional tube 60 into the annular tube 16, as is shown in the left-hand portion of the drawing of FIG. 7. In this case, the tube 60 is preferably filled with a gas, a liquid, a gel- or foam-like or another appropriate viscous material in order to maintain its dimensional stability. Since the tube 60 itself can not come into contact with the milked milk, this double-tube arrangement has the advantage that arbitrary tight materials which are not appropriate for parts having contact with the milk may be used for the tube 60. This may have advantages with respect to manufacturing costs or to tightness of the filled tube arrangement. On the contrary, for the annular tube 16 of the teat rubber, which is in many cases made of silicon which on a long term is not tight at least with respect to air, only materials may be used which are permissible for parts having contact with milk, since contact with milk may not be completely avoidable.

In the example shown in the right-hand portion of the drawing of FIG. 7 the protrusion 36 at its radially inner side carries a profiled annular projection 38 engaging with a corresponding recess in the holding edge 20, thus providing a secure attachment at the latter. Furthermore, the protrusion 36 at its bottom has an encompassing protrusion 37 which encompasses the holding edge 20 axially and thus further improves the connection between the latter two parts. If necessary, the connection between the holding edge 20 and the encompassing protrusion 37 may be discontinuous by pulling the annular projection 38 from the corresponding recess. For securing the connection between these two parts, a strap 39 may be disposed around the protrusion 36. Another possibility of designing the surfaces of the holding edge 20 and the protrusion 36 lying on each other is shown in the left-hand portion of the drawing of FIG. 7 wherein each surface consists of annular bulbs 43 arranged contiguous to each other in the axial direction, each annular bulb of the holding edge 20 being complementary to a corresponding annular dimple in the protrusion 36 and vice versa.

FIG. 8 shows how the bulb arrangement shown in the left-hand portion of FIG. 7, in an appropriate design, may be used. When the bulbs are shaped uniformly and also the encompassing protrusion 37 fits into the pitch defined by the bulbs, the protrusion 36 may be secured to the holding edge 20 at different heights or axial positions, respectively. Thereby, a height adjustability of the axial length of the annular tube can be achieved, as is indicated symbolically by the double-headed arrow C. Given a corresponding design of the annular tube 16, in particular with respect to the material used, the wall thickness, and the casting mold, also the inner width of the annular tube 16 may be varied which is illustrated by the double-headed arrow D.

The liners described above may be, but are not necessarily manufactured of rubber, they can also be manufactured of silicon or other elastomers which are appropriate for use with parts having contact with milk.

It is self-evident that the invention is not restricted to the embodiments illustrated and described previously. For example, the exact shape of the annular tube may be adapted to the practical requirements, or the constructive design of individual parts may be done according to demands of manufacturing. Furthermore, it should be noted that the features of the invention which were described with respect to individual embodiments may well be present with other embodiments unless indicated otherwise or evident because of technical reasons. As examples therefor, the annular lips, the subdivision of the annular tube or the provision of a tube in the annular tube, the possibility of opening the annular tube and the axial adjustability of the annular tube as well as the constrictions and recesses, are to be mentioned.

What is claimed is:

1. A liner for use with a substantially undeformable teatcup shell for forming a two-chambered teatcup, by means of which milk is extracted from a teat in a suction milking process through a milking vacuum provided during a milking phase, and the teat is massaged during a rest phase, wherein
    the liner comprises a head part that is substantially rotationally symmetrical relative to its longitudinal axis and a barrel part that is connected to the head part by means of a transitional part,
    the head part is formed as an annular tube, which forms an insertion opening for the teat,
    the annular tube is configured such that an annular hollow space is defined by the teat, the transitional part and the annular tube once the teat is introduced into the barrel part,
    the inner width of the insertion opening of the annular tube is smaller than the maximum inner width of the barrel part, and
    the annular tube is sufficiently flexible that the inner width of its insertion opening is enlargeable radially outward and its axial length is changeable during introduction of the teat.

2. The liner according to claim 1, wherein the annular tube has a constriction at its radially outer side and a constriction at its radially inner side which are disposed in the circumferential direction of the annular tube in a plane substantially orthogonal to the longitudinal axis of the liner.

3. The liner according to claim 1, wherein the head part, at its radially outer side in the region of the end of the transitional part facing the insertion opening, has a recess which is disposed in the circumferential direction of the annular tube in a plane substantially orthogonal to the longitudinal axis of the liner.

4. The liner according to claim 1, the annular tube, at its radially inner side, has at least one rib which is disposed in the circumferential direction of the annular tube in a plane substantially orthogonal to the longitudinal axis of the liner.

5. The liner according to claim 1, wherein the annular tube is closed and is filled with a material taken from a group of materials comprising gas, liquid, gel-like, foam-like, and viscous materials.

6. The liner according to claim 5, wherein the annular tube is provided with an opening through which it may be filled or connected to a pressure source.

7. The liner according to claim 1, wherein the wall of the annular tube, in the region of the end of the transitional part facing the insertion opening, is discontinuous over the whole circumference of the annular tube, wherein the radially outer end of the wall may be positioned in contact with the radially inner end of the wall while sealing the interior formed in the annular tube, and wherein the radially outer end is continued in a protrusion which is shaped such that it can surround the end of the teatcup shell facing the insertion opening over at least a portion of the axial length of the teatcup shell.

8. The liner according to claim 7, wherein the protrusion is attachable to the teatcup shell in different axial positions.

9. The liner according to claim 1, wherein the annular tube is subdivided by at least one partition wall which is disposed in a plane substantially orthogonal to the longitudinal axis of the liner, into tube portions which are displaced axially with respect to each other.

10. The liner according to claim 1, wherein a tube is disposed in the annular tube.

* * * * *